US011028868B2

(12) United States Patent
Hirschmann et al.

(10) Patent No.: US 11,028,868 B2
(45) Date of Patent: Jun. 8, 2021

(54) PRESS-FIT CONNECTION BETWEEN A HIGH-STRENGTH COMPONENT AND A PRESS-FIT ELEMENT, METHOD FOR MAKING SUCH A PRESS-FIT CONNECTION, AND PRESS-FIT ELEMENT FOR SUCH A PRESS-FIT CONNECTION

(71) Applicant: RICHARD BERGNER VERBINDUNGSTECHNIK GMBH & CO. KG, Schwabach (DE)

(72) Inventors: Markus Hirschmann, Erlangen (DE); Juliane Niedermueller, Buechenbach (DE); Bastian Zimmermann, Weigendorf (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 284 days.

(21) Appl. No.: 15/464,969

(22) Filed: Mar. 21, 2017

(65) Prior Publication Data
US 2017/0268553 A1   Sep. 21, 2017

(30) Foreign Application Priority Data
Mar. 21, 2016   (DE) ..................... 10 2016 204 619.5

(51) Int. Cl.
F16B 19/00 (2006.01)
F16B 37/06 (2006.01)
F16B 5/00 (2006.01)

(52) U.S. Cl.
CPC .............. F16B 19/00 (2013.01); F16B 5/00 (2013.01); F16B 37/065 (2013.01)

(58) Field of Classification Search
CPC ........ F16B 37/04; F16B 37/048; F16B 37/06; F16B 37/062; F16B 37/065; F16B 19/00; F16B 5/00
See application file for complete search history.

(56) References Cited

U.S. PATENT DOCUMENTS 1,705,463 A * 3/1929 Andren .................. B21K 1/702
411/180
1,759,339 A * 5/1930 Andren ................. F16B 37/065
411/180
(Continued)

FOREIGN PATENT DOCUMENTS

CN   202789931 U * 3/2013
CN   103711781 A * 4/2014
(Continued)

Primary Examiner — Matthew R McMahon
(74) Attorney, Agent, or Firm — Laurence A. Greenberg; Werner H. Stemer; Ralph E. Locher

(57) ABSTRACT

A press-fit connection between a high-strength component and a press-fit element is characterized by a non-circular previously made hole into which the press-fit element having a collar is inserted. Here, the collar is merely upset and pressed against a hole rim without embracing an underside of the component. Preferably, the hole rim is widened in a longitudinal direction such that a form-locking connection acting in opposition to the longitudinal direction is formed. The non-circular hole geometry is produced with the aid of a punch of circular cross sectional geometry, in that a cutter of the punch has leading and recessed cutting regions, with the result that disrupted partial regions are formed.

16 Claims, 3 Drawing Sheets

(56) References Cited

U.S. PATENT DOCUMENTS

| | | | | |
|---|---|---|---|---|
| 1,813,968 A | * | 7/1931 | Simons | F16B 37/065 411/183 |
| 1,856,236 A | * | 5/1932 | Booth | B60B 1/0207 301/35.57 |
| 1,883,906 A | * | 10/1935 | Hasselquist | B21K 25/00 29/512 |
| 2,127,696 A | * | 8/1938 | Mitchel | B21K 1/702 411/177 |
| 2,170,472 A | * | 8/1939 | Fitch | F16B 33/002 29/509 |
| 2,985,213 A | * | 5/1961 | Consandine | F16B 37/065 411/183 |
| 4,627,776 A | * | 12/1986 | Pamer | F16B 37/068 411/179 |
| 5,251,370 A | | 10/1993 | Muller | |
| 5,797,175 A | | 8/1998 | Schneider | |
| 6,712,370 B2 | * | 3/2004 | Kawada | B60G 13/003 280/124.155 |
| 6,771,490 B2 | * | 8/2004 | Peker | C22C 33/003 148/403 |
| 6,969,053 B2 | * | 11/2005 | Kawada | B60G 13/003 267/220 |
| 8,221,040 B2 | * | 7/2012 | Babej | F16B 37/065 411/183 |
| 8,230,574 B2 | * | 7/2012 | Schmidt | B21K 25/00 29/525.06 |
| 8,646,166 B2 | * | 2/2014 | Babej | F16B 37/065 29/524.1 |
| 8,870,505 B2 | * | 10/2014 | Tsai | F16B 37/065 411/183 |
| 9,175,715 B2 | | 11/2015 | Babej | |
| 2002/0163155 A1 | * | 11/2002 | Kawada | B60G 13/003 280/124.155 |
| 2003/0062811 A1 | * | 4/2003 | Peker | C22C 33/003 312/223.1 |
| 2003/0189278 A1 | * | 10/2003 | Kawada | F16F 9/54 267/292 |
| 2007/0166128 A1 | * | 7/2007 | Nilsen | F16B 33/004 411/533 |
| 2009/0175675 A1 | * | 7/2009 | Schmidt | B21K 25/00 403/20 |
| 2009/0313803 A1 | * | 12/2009 | Niedermuller | F16B 37/068 29/505 |

FOREIGN PATENT DOCUMENTS

| | | | | |
|---|---|---|---|---|
| DE | 2818756 A1 | | 11/1979 | |
| DE | 19639007 A1 | * | 3/1998 | B23P 19/062 |
| DE | 19808628 A1 | * | 9/1999 | B64C 1/12 |
| DE | 102004042478 B4 | | 5/2008 | |
| DE | 102007027106 A1 | | 12/2008 | |
| DE | 102008052383 A1 | | 4/2010 | |
| DE | 102009025525 A1 | | 4/2010 | |
| DE | 102009032083 A1 | | 1/2011 | |
| DE | 102012220033 A1 | | 5/2014 | |
| EP | 0667936 B1 | | 4/1997 | |
| EP | 2667043 A1 | * | 11/2013 | F16B 37/067 |
| EP | 2549128 B1 | | 5/2014 | |
| GB | 806650 A | * | 12/1958 | F16B 37/062 |
| JP | 3121114 U | | 4/2006 | |

\* cited by examiner

PRESS-FIT CONNECTION BETWEEN A HIGH-STRENGTH COMPONENT AND A PRESS-FIT ELEMENT, METHOD FOR MAKING SUCH A PRESS-FIT CONNECTION, AND PRESS-FIT ELEMENT FOR SUCH A PRESS-FIT CONNECTION

CROSS-REFERENCE TO RELATED APPLICATION

This application claims the priority, under 35 U.S.C. § 119, of German application DE 10 2016 204 619.5, filed Mar. 21, 2016; the prior application is herewith incorporated by reference in its entirety.

BACKGROUND OF THE INVENTION

Field of the Invention

The invention relates to a press-fit connection between a high-strength component and a press-fit element. The invention further relates to a method for making such a press-fit connection, and to a press-fit element for such a press-fit connection.

A press-fit connection of this kind can be found for example in German patent DE 10 2004 042 478 B4.

The term "high-strength components" is used in the present document to mean components, in particular metal sheets, having a strength of >600 MPa. High-strength and extremely high-strength components of this kind are used in particular in the automotive industry among others for the purpose of weight reduction while at the same time maintaining the required high strengths. Here, the sheet thickness of metal sheets of this kind is typically between 0.4 and 4 mm and in particular between 0.6 mm and 2.6 mm. The term "extremely high-strength metal sheets" is used in the present document to mean metal sheets having a strength of >1,000 MPa. Nowadays, steel sheets having strengths of >1,500 MPa are already used in certain regions of a motor vehicle.

As a result of the high strengths, the incorporation of press-fit elements such as nuts or bolts is associated with greater demands. Because of the high strength, it is usually impossible, or possible only with difficulty, to form or deform the metal sheet. At the same time, however, on the one hand sufficient resistance to axial extraction must be ensured, as well as sufficient resistance to twist in the case of threaded press-fit elements.

In the case of conventional components that are not of high strength, a desired resistance to extraction and twist is usually achieved by deforming the metal sheet in the region of a preformed hole. To provide the resistance to twist, press-fit elements of this kind in this case usually have radially extending ribs on a head contact surface of the press-fit element. These ribs are pressed into the upper side of the component. An example of this can be found in European patent EP 0 667 936 B1, corresponding to U.S. Pat. No. 5,797,175.

However, deformation of the metal sheet with the aid of the press-fit element is in particular impossible, or possible only with difficulty, if the strength of the component is greater than that of the press-fit element, which is normally the case with high-strength and extremely high-strength components. To provide resistance to twist, in this case it is possible to select non-circular cross sectional geometries in the region of connection between the press-fit element and the hole rim.

Thus, for example, a press-fit element can be found in published, non-prosecuted German patent application DE 10 2012 220 033 A1 that has on its head underside a joining section with an approximately rectangular cross sectional geometry. For the purpose of resistance to axial extraction, this joining section moreover has on its outer surface a peripheral bead. When the connection is made to the component, this bead is intended to displace a hole rim of the high-strength component elastically during the press-fit operation such that the peripheral bead penetrates, as it were, into the hole rim by a certain amount. Problems may arise here in particular in the event of large differences between the strength of the press-fit element and that of the component, since in that case a sufficiently elastic widening of the hole rim is no longer ensured and in some circumstances there is also a risk that the bead will shear off during the press-fit operation.

For the purpose of providing sufficient resistance to axial extraction, it is furthermore known to set a bead around a forming collar of the press-fit element. Here, this forming collar embraces an underside of the component, as it were in the manner of a rivet collar. A press-fit connection of this kind can be found for example in German patent DE 10 2004 042 478 B4. However, during this beading operation, high tangential tensile stresses arise which in some circumstances may result in undesired cracks and hence a drop in strength, and possibly corrosion.

According to German patent DE 10 2004 042 478 B4 it is furthermore provided, for the purpose of resistance to twist, for a non-circular hole, for example having an oval or trilobal geometry, to be made in the high-strength component and then, during the press-fitting of the press-fit element, for the annular forming collar thereof to be radially widened to differing extents such that the collar fits the non-circular peripheral contour of the hole. In this case too tangential tensile stresses arise that may result in the above-mentioned problems.

As well as the tangential tensile stresses, it is furthermore fundamentally disadvantageous that, as a result of embracing it, the press-fit element projects beyond the underside of the component. In some circumstances this results in problems if further components are to be secured to the component underside. In this case, an underside that is as planar as possible is usually desired.

A further press-fit connection can be found in European patent EP 2 549 128 B1 (corresponding to U.S. Pat. No. 9,175,715), in which a forming collar again reaches below an underside of the component in the region of the hole rim for the purpose of providing a positive engagement acting in the axial direction. This embracing partial region is prevented from projecting in that, before penetration by the press-fit element, the metal sheet is drawn up in the region of the hole rim, approximately in the manner of a dome, in the direction of a head part of the press-fit element. However, this disadvantageously requires a forming procedure to be carried out on the component before the press-fit operation. Moreover, as the strength of the component increases, forming becomes difficult.

A press-fit connection can be seen from published, non-prosecuted German patent application DE 10 2009 025 525 A1, in which a positively engaging connection has been dispensed with both for the resistance to axial extraction and the resistance to twist. All that is made is a sufficient frictional connection. For this purpose, the press-fit element has on the head underside a shaft region having a polygonal cross sectional contour, wherein the corner regions are at least partly sheared off during the press-fit operation with the aid of a circular die, and the material that is sheared off in this way is pressed against the hole rim of a circular hole. Here, there is thus no forming of the press-fit element in the sense of deformation, such as widening, etc., nor is there a deformation of the hole. As a result of the shearing, the press-fit element is as a whole put under heavy load. It is also possible for the surface of the press-fit element to undergo undesired damage as a result of this, such that there is a risk of corrosion.

SUMMARY OF THE INVENTION

Taking this as a starting point, an object of the invention is to enable a press-fit connection between a press-fit element and a high-strength component. Wherein on the one hand this connection can be made as inexpensively and operationally reliably as possible and on the other it has a good resistance to extraction and to twist. Furthermore, tensile stresses and hence the risk of cracks are to be avoided as far as possible. A further object of the invention is to provide a suitable method for making a press-fit connection of this kind and a suitable press-fit element for a press-fit connection of this kind.

The press-fit connection is made between a high-strength component, in particular a steel sheet, and a press-fit element. The press-fit element is pressed into a pre-shaped hole, wherein for the purpose of providing resistance to twist this hole has a cross section other than a circular shape. The press-fit element has a head part and a collar, adjoining the latter in the longitudinal direction. The press-fit element lies on an upper side of the component by means of a head contact face of the head part, that is to say by the underside thereof. For the purpose of providing resistance to extraction that is effective in the longitudinal direction, the collar is pressed by an upset process against a hole rim of the pre-shaped hole without the collar embracing an underside of the component. A press fit is thus provided between the collar and the hole.

For the purpose of providing the press-fit connection, the upset process thus provides solid forging in three spatial directions, in particular compressive deformation along three axes. This avoids undesired tangential tensile stresses and hence the risk of cracks. All that is provided is a press fit. Thus, the collar forms an upset section by way of which a volume of material for partial upsetting, as it were, is provided in the starting condition and is pressed against the hole rim to provide the press fit by solid forging. For this reason, there is no conventional forming, in the sense of making a bead or radially widening, during which tangential tensile stresses would be applied. Nor is there any shearing off or separation of material, which would result in damage to the surface. Accordingly, the press-fit collar is also characterized in that it has no tensile deformations and no tensile stresses. Tensile deformations of this kind result in characteristic changes in the microstructure that differ from compressive deformations and are recognizable for example in micrographs.

As well as avoiding cracks, the combination of these features moreover provides a reliable resistance to extraction and a reliable resistance to twist. On the one hand, the collar does not project beyond the underside of the component, with the result that overall a planar component underside is ensured. Here, the collar ends in particular flush with the underside of the component or is at most slightly recessed, for example by a maximum of 20% of the thickness of the component. Here, the component thickness is usually between 0.4 and 4 mm and preferably between 0.6 and 2.6 mm.

This construction is based on the realization that the press fit between the collar and the hole is sufficient for resistance to axial extraction. Forming the component after the hole-making operation, which is performed in particular by a punching process, is not necessary and indeed is preferably not performed. For this reason, the component preferably has no deformation in the region of the hole. By this it is meant that no forming is required or provided, either by press fitting the press-fit element or by a separate sheet forming operation in the region of the hole, for example by drawing up the hole rim in the manner of a dome.

Preferably, besides the non-circular hole geometry there are no other elements for providing resistance to twist, and in particular no ribs that penetrate into the upper side of the component are constructed on the head contact face. Nor are any elements providing resistance to twist, such as a bead, constructed on the collar itself. In general, there is no forming of the (metal sheet) component for providing resistance to twist. All that is done is solid forging of the collar of the press-fit element.

Preferably, the measure for providing resistance to axial extraction amounts only to pressing the collar against the hole rim in the upset process, for providing the press fit. This is based on the consideration that, in particular during a suitable hole punching operation, the hole rim of the pre-shaped hole has already been sufficiently constructed for merely pressing the collar against the hole rim to be sufficient for the required resistance to extraction. Here, the fact that during the punching process the latter can be set up such that a hole that widens in the longitudinal direction is formed is utilized. The latter is achieved in particular by making the hole larger during the punching process. The hole rim is thus widened in the longitudinal direction. By upsetting and pressing the collar against the hole rim, the material of the collar is thus advantageously pressed as it were into an undercut by a material flow process, with the result that a positive engagement acting in the axial direction is provided.

As a result of the upset process and the provision of the press fit, both the resistance to axial extraction and the resistance to twist are thus reliably provided.

In an advantageous embodiment, the press-fit element, at least the collar, has a circular cross sectional geometry in the starting condition. The term "starting condition" here is used to mean the condition before the press-fit operation. Specifically, the entire press-fit element has a rotational symmetry and so is constructed to be circular in cross section. As a result of this measure, the press-fit element may in particular be manufactured using simple production engineering and thus inexpensively. No complex geometries of the press-fit element are required. The desired resistance to twist is achieved by radially pressing the collar, asymmetrically as it were, against the non-circular hole rim.

In an advantageous embodiment, the pre-shaped hole furthermore extends along the line of a circle arc, wherein the hole rim is disrupted in a partial region, as a result of which the cross sectional shape that is other than circular is formed. Preferably, precisely two, in particular mutually opposing, disrupted partial regions of this kind are provided. Here, each partial region extends for example over only a few tens of degrees, for example over 30° to 60°. Overall, the disrupted partial regions cover at most an angular range of less than 180°, preferably at most 120°. In the remaining region, the hole rim extends along a circle-arc line.

This is the result of the preferred, particularly advantageous, hole punching operation that is used with a specific punch, as will be described below. This punch is characterized on the one hand in that it has a circular cross sectional geometry. In respect of the provision of the disrupted partial regions, it has a peripheral cutter that has axially recessed cutting regions. As a result, cutting in the partial regions that are later disrupted is not clean. As a result of a specific geometry of the punch, an unclean hole punching operation is therefore deliberately performed such that, despite the fact that a circular punch is used, a non-circular hole geometry is produced.

As an alternative or in addition to the specific cutting geometry of the punch, the unclean hole geometry is achieved by a specific combination of punch and punching die, for example in that this pair of punching elements containing the punch and the punching die define unlike cross sectional geometries, and hence a variable cutting gap in the peripheral direction. Here, the cutting gap is in general the radial spacing between the cutting edge of the punch and the hole rim of the punching die. For example, a circular punch is combined with a non-circular punching die, or vice versa.

In particular given this specific hole punching operation, the hole in the disrupted partial region has a diameter that is larger by only a few tenths of a millimeter. The difference in diameter here is approximately in the range between 0.05 and 0.3 mm, preferably only in the range between 0.05 and 0.15 mm. Here, the diameter refers on the one hand to the diameter of the circle-arc line, and on the other the diameter is the maximum spacing between opposing disrupted partial regions, or twice the maximum spacing from the edge of the disrupted partial region to the center axis.

As a result of the specific punching process, the disrupted region is characterized by an irregular course. In this context, different holes typically have differently disrupted hole rims.

Furthermore, providing a fundamentally circular hole with disrupted partial regions has the particular advantage that during the press-fit operation a rotationally symmetrical punching die, which need not be aligned in respect of its rotational orientation, can likewise be used. As a result, overall both the punching operation and the subsequent press-fit operation are of a simple construction, and are thus easy to handle with operational reliability.

In principle, however, it is also possible to create a non-circular hole geometry in an alternative manner to the circular hole with the disrupted partial regions, by means of a non-circular punch. This may be for example an oval or indeed a trilobal geometry.

A further particular advantage of the disrupted partial regions can be seen in the face that only a comparatively small radial compression of the collar is required. Specifically, during the upset process only compressive stresses are introduced into the collar. Here, there is no risk of undesired cracks being formed, or a drop in strength and corrosion at the press-fit element.

Where the term "high-strength component" is used in the present document, this is understood to mean a component having a strength of >600 MPa, preferably >800 MPa, more preferably >1,000 MPa, even more preferably >1,400 MPa, in particular up to 2,000 MPa.

For the purpose of making the press-fit connection, according to the invention the procedure here is preferably such that first, in a hole-making operation, the hole is created with the peripheral contour having a shape other than circular, by means of a punch. Then, in a second process step (the press-fit operation), the press-fit element is introduced into the pre-shaped hole, and the collar is upset using a die brought from the underside of the component, and is pressed against the hole rim. During this, the press-fit element is compressed against the die using a suitable pressing tool.

The die in this case has a die flange, which is in particular annular or circular and is constructed such that the collar is upset. All that occurs during this is that the collar is compressed radially against the non-circular hole rim. Because of the shape of the hole rim, which in particular widens conically, this also provides in particular an axially effective positive engagement.

Specifically for press fitting a press-fit nut, preferably a die that is divided into two is used, with an outer annular die flange and an inner support element, for example a support punch or a support ring. In this case the support element is held displaceably in relation to the die flange, and in particular with spring loading. Furthermore, the support element projects, preferably forward, beyond the die flange. During the press-fit operation, the die flange is pressed against the collar of the press-fit element in order to press it against the hole rim. At the same time, the in particular spring-urged support element is supported against an inner annular face of the press-fit nut. Here, the die flange is arranged in particular to be concentric with the support element and surrounds the latter, preferably directly. As a result of this measure, a defined upset process is ensured only radially outwardly, without deforming the collar inward in the direction of a thread. Consequently, the thread remains true to gage.

As already mentioned above, during this the hole is preferably made with the aid of a specific punch with recessed cutting regions, with the result that the disrupted partial regions are created.

In an advantageous embodiment, the punch here is constructed with its front end face in the shape of a roof, and this roof is preferably at an angle in the range of for example 100° to 140° and in particular approximately 120°. Because of the roof shape, the punch has in its center a leading cutting region of its peripheral cutter. For this reason, the punch is preferably pressed against the surface of the component in the approximate shape of a wedge, and incision is performed by the leading regions, as a result of which the circle-arc line is created. Because of the roof shape, the recessed cutting regions do not provide optimum cutting but rather pressing, which results in the disrupted partial regions.

As an alternative to the embodiment having the central leading cutting regions, the leading cutting regions are preferably arranged on the outside, that is to say that here the punch is preferably in the shape as it were of a roof too, but has an inward curve wherein the roof shape is toward the inside.

As regards the desired conically widening construction of the hole, a specific combination of punch and punching die is used. In particular, the punching die usually has a central aperture whereof the radius corresponds to the radius of the punch plus at least 15% and preferably at least 18% of the thickness of the component, specifically plus 20% to 25% of the thickness of the component. Overall, there is thus a cutting gap between the punch and the associated punching die that is deliberately larger than is conventional. This cutting gap is generally defined by the difference in diameter between the punch and the aperture. This is in fact achieved in that the punch—in particular also in the case of relatively thin metal sheets—cuts the metal sheet relatively cleanly only in a narrow region on the upper side of the sheet and, toward the underside of the component, an enlargement in the cutting edge is formed, with the desired conical widening. Overall, this has the effect of providing a reliable resistance to extraction without the need for embracing the underside of the component.

As mentioned above, the desired unclean enlargement in the hole rim may also be achieved by a cutting gap that varies in the peripheral direction.

The present method and the press-fit connection that is made therewith are thus characterized by a particular combination of a specific punch in combination with a specific punching die that are constructed and matched to one another such that on the one hand the non-circular hole geometry is provided by disrupting the partial regions and at the same time the hole rim, which is also made larger in the longitudinal direction, is provided for creating the widening hole. Overall, both a positively engaging resistance to twist and also a positively engaging resistance to axial extraction can be realized using the hole prepared in this way.

By means of the press-fit connection described here and the method described, it is possible to achieve in particular the now listed advantages. Preferably all the elements may be made rotationally symmetrical and hence inexpensively. In particular, no additional elements for providing resistance to twist, as such radial ribs, are required or indeed provided. The forming of the steel sheet either before or after the press-fit operation is not required or provided. In particular, a preforming process, for example for drawing up the hole rim, is dispensed with. The non-circular hole geometry using the selected punches with a circular cross sectional geometry and preferably in the shape of a roof or pitched roof is particularly simple and indeed inexpensive. The same is true of the punching die, which is preferably also of simple and rotationally symmetrical construction. In particular in this case, there is no need for alignment of the rotational position of the punching die in relation to the non-circular hole. In principle, the press-fit element may be used for different thicknesses of metal sheet and so is independent of the sheet thickness. In order to achieve the resistance to twist, all that needs to be done is to fill the hole volume of the disrupted partial region with material from the collar. No part of the collar projects beyond the underside of the component. Only compressive stresses are produced in the collar, and there is no risk of cracks being formed or a drop in strength.

According to the invention, the press-fit element has in general a head contact face that is free of any elements for providing resistance to twist. Furthermore, the collar preferably has a smooth outer surface without any beads, ribs or similar. Specifically, this collar is provided with a cylindrical or conical outer surface. Furthermore, the collar only has a maximum height that is at most 30% and preferably at most 20% greater than the thickness of the component for which the press-fit element is provided. The axial height is in this case in particular of a dimension such that after the press-fit operation the collar does not project beyond the underside of the component. Because of the (upset) forces that occur during the press-fit operation, a height that is somewhat greater in the starting condition than the thickness of the component is permissible.

Here, the axial height is for example 0.6 mm to 0.7 mm (for use with thin metal sheets having a thickness of up to 1 mm), 0.9 mm to 1.1 mm (for use with metal sheets having a thickness of 0.8 mm to 1.5 mm), 1.4 to 1.6 mm (for use with metal sheets having a thickness of 1.3 mm to 1.8 mm), 1.8 mm to 2.0 mm (for use with metal sheets having a thickness of 1.6 mm to 2.2 mm) or 2.2 to 2.4 mm (for use with metal sheets having a thickness of 2.4 mm to 3 mm).

The press-fit element is in particular a press-fit nut or a press-fit bolt.

The term "press-fit nut" is here generally understood to mean an element having an internal cavity that is usually oriented concentrically in relation to a center axis of the press-fit element. This internal cavity optionally has an internal thread or can also have no internal thread. In the latter case, the press-fit element is thus constructed as a tube, as it were. The latter is used for example in the automotive sector for feeding through lines, etc. In a particularly preferred manner, a tube of this kind is also used for screwing in self-tapping screws in particular. This is a particular advantage, since self-tapping screws cannot be screwed into the high-strength metal sheet.

In the case of a construction as a press-fit bolt, the head part is generally adjoined by a shaft region that is optionally provided with an external thread, or indeed not. In the first case, with an external thread, this is a screw bolt, and in the second case it is in particular a simple plain bolt.

When used as a press-fit bolt, an inward curve is preferably constructed between the shaft and the collar. The inward curve furthermore preferably has a radial width that preferably lies in the range between 0.5 times and 1.2 times the radial width of the collar. This measure ensures that the collar is widened operationally reliably, without any risk of cracks forming. In particular, the root of the inward curve has a relatively large radius.

In the case of a construction of the press-fit element as a press-fit nut having a central internal hole, in a preferred embodiment an annular face is provided between the internal hole and the collar. At the end, the head contact face adjoins the collar in the radial direction. In the case of this press-fit nut, it is further provided for the radial width of this annular face to be greater than or equal to the radial width of the head contact face. This has the effect that the collar is spaced from the internal hole and hence from any internal thread. As a result, what might be called a buffer spacing is created between the collar and the internal thread, with the result that the forces that act during the press-fit operation have as little effect on the internal thread as possible, with the result that it is ensured that the thread is true to gage as required.

As an alternative or in addition thereto, the head contact face is recessed from the annular face in the longitudinal direction. As a result of this measure, overall the longest possible length of the internal thread is achieved, at the same time as the smallest possible head height of the head part.

Furthermore, the press-fit element preferably has a strength smaller than the strength of the component. Preferably, the press-fit elements have one of the usual strength classes 8.8, 9.8, 10.9, 12.9 (for screws) or 8, 10, 12 (for nuts) in accordance with DIN EN ISO 898-1 (Screws) or DIN EN ISO 898-2 (Nuts).

Press-fit connections of this kind are preferably used in motor vehicle components in a motor vehicle. Depending on the requirement, the press-fit elements may be of different constructions (with thread, without thread, different types of thread) and may also be provided with surface coatings, such as a zinc-based surface. In this case, the press-fit elements are usually introduced on a production line, in an inline manufacturing process. This also provides the possibility that the press-fit elements are introduced into a component that is still warm, for example one coming from the press.

Other features which are considered as characteristic for the invention are set forth in the appended claims.

Although the invention is illustrated and described herein as embodied in a press-fit connection between a high-strength component and a press-fit element, a method for making such a press-fit connection, and a press-fit element for such a press-fit connection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
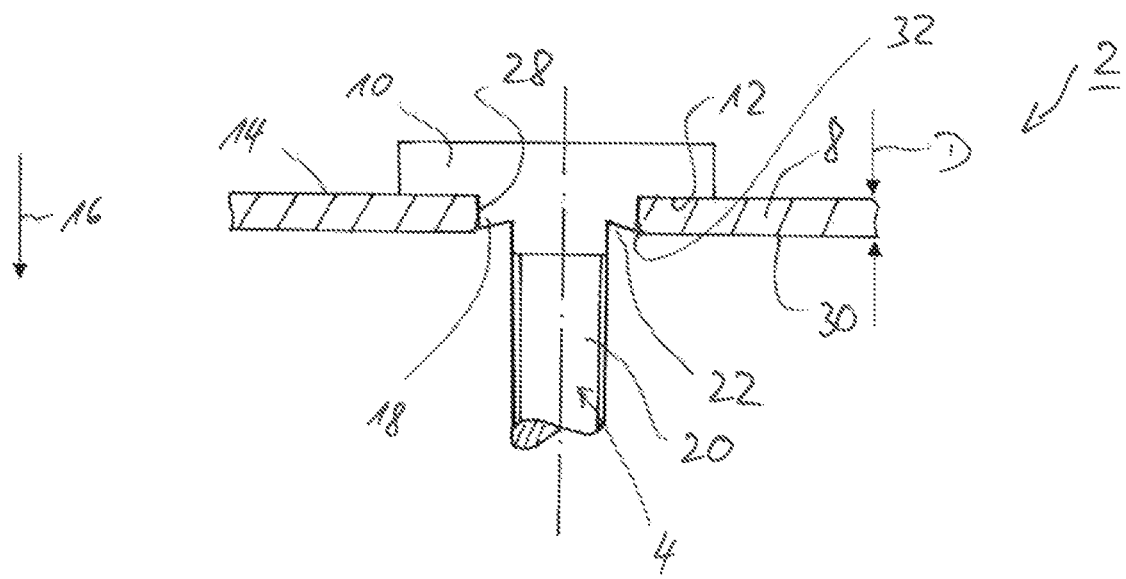
FIG. 1 is a diagrammatic, cross sectional view through a press-fit connection between a press-fit bolt and a high-strength component.

In the figures, parts having a like action are provided with like reference numerals.

Figure 2:
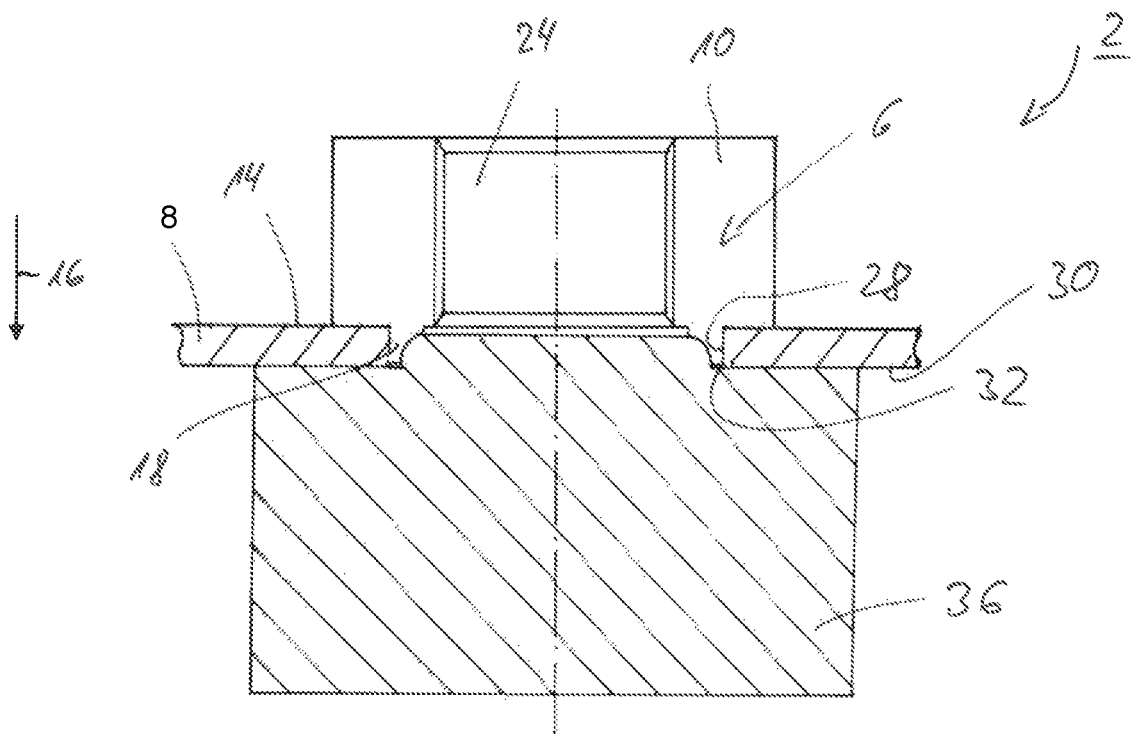
FIG. 2 is a sectional view of the press-fit connection at an end of the press-fit operation between the press-fit nut and the component, with a punching die.

Referring now to the figures of the drawings in detail and first, particularly to FIGS. 1 and 2 thereof, there is shown a press-fit connection 2 in each case of a connection between a press-fit element, which in FIG. 1 is constructed as a press-fit bolt 4 and in FIG. 2 as a press-fit nut 6, and a high-strength sheet-metal component 8. Here, the respective press-fit element 4, 6 has in each case a head part 10, on an underside whereof there is constructed a head contact face 12 by which the respective press-fit element 4, 6 lies on an upper side 14 of the component 8. The respective press-fit element extends in a longitudinal direction 16, with in each case a collar 18 adjoining the head part 10 in the longitudinal direction 16. In the case of the press-fit bolt 4, a shaft 20 adjoins the head part 10. The shaft has a peripheral inward curve 22 in the region of the collar 18. The press-fit nut 6 has a central internal hole 24 that is in particular provided with an internal thread. The shaft 20 is preferably provided with an external thread.

The respective press-fit element 4, 6 is press fit into a previously made hole 26 (in this regard, see in particular FIGS. 6A and 6B) of the component 8.

The hole 26 is delimited by a hole rim 28. The hole rim 28 has an enlargement 32 at an underside 30 of the component 8, with the result that the hole rim 28 and hence also the hole 26 widen toward an underside 30. In addition, a narrowing may be made toward the upper side 14. As a result, and as seen in cross section, the shape of the hole rim is made approximately convex overall. However, the crucial point is the enlargement 32, with the increasing hole diameter toward the underside 30.

As can furthermore be seen from FIGS. 1 and 2, the collar 18 is pressed radially against the hole rim such that it is adapted in particular to the widening hole rim 28. As a result, a resistance to axial extraction that is effective in the longitudinal direction 16 is provided by the provision of a positive engagement that is effective in opposition to the longitudinal direction 16. It is particularly important here that the collar 18 does not project beyond the underside 30 or embrace it. The collar 18 merely forms a way of engaging behind the widened hole rim 28.

In addition to this resistance to axial extraction, a resistance to twist is furthermore provided. For this, the pre-punched hole 26 is made non-circular, so has a peripheral contour other than circular in shape, such as is seen in particular from FIGS. 6A and 6B (lower region of the drawing). During the press-fit operation, the collar 18 is adapted in the radial direction to this non-circular peripheral contour, for the purpose of providing the resistance to twist, by solid forging during an upset process, and is pressed against the hole rim 28, forming a press fit.

Figure 3A:
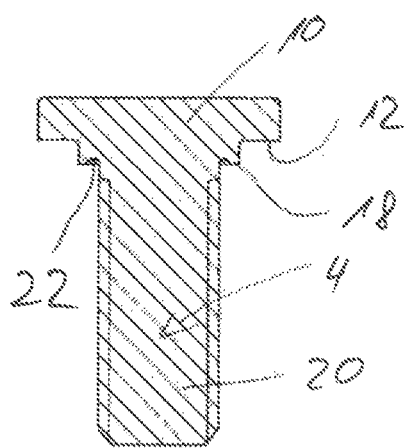
FIG. 3A is a cross sectional view of the press-fit bolt.
Figure 3B:
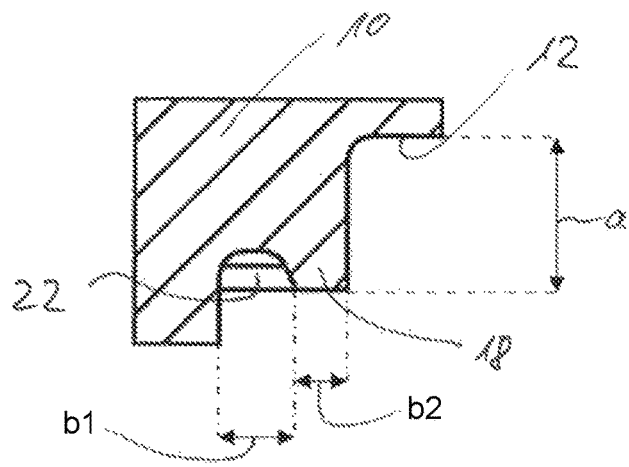
FIG. 3B is a cross sectional view on a larger scale of a detail of the press-fit bolt according to FIG. 3A, in a region of a collar.

FIG. 3A shows once again a cross sectional illustration of the press-fit bolt 4, and FIG. 3B shows an illustration on a larger scale of a detail in the region of the collar 18. An inward curve 22 is very readily visible from this detail illustration on a larger scale. It has a radial width b1 which lies approximately in the range of the radial width b2 of the collar 18. The radial width b1 of the inward curve 22 corresponds to the radial extent of the inward curve 22 from the shaft 20 to the transition to the substantially horizontal end face of the collar 18. The radial width b2 of the collar 18, which is in the shape of an annular flange, here corresponds to the radial extent of the end face of this collar 18.

Furthermore, the collar 18 has an axial height a that is adapted to a thickness D (see FIG. 1) of the component 8, such that in the press-fit condition the collar 18 does not project beyond the underside 30. Preferably, in the incorporated condition, the collar 18 ends flush with the underside 30 or is at most slightly recessed therefrom. Here, the axial height a is the spacing in the longitudinal direction 16 from the head contact face 12 to the end face of the collar 18.

Figure 4:
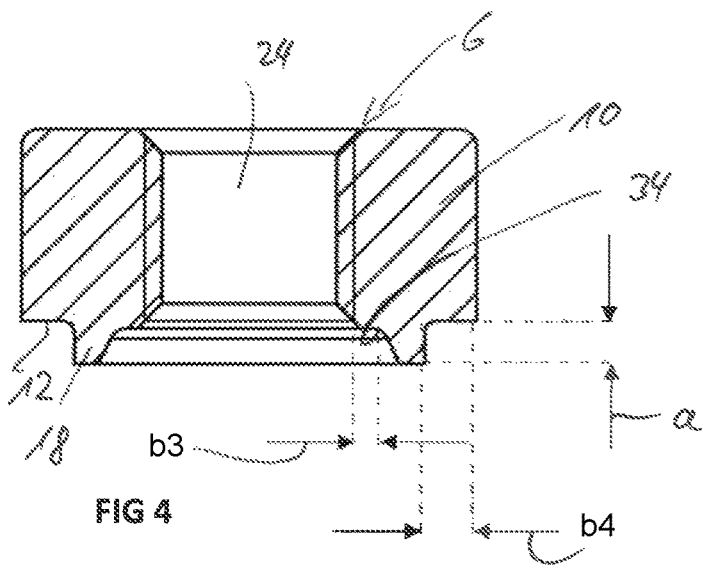
FIG. 4 is a cross sectional view of the press-fit nut.

It can be seen from the cross sectional illustration in FIG. 4 that in the case of the press-fit bolt 4 the collar 18 is radially spaced from the internal hole 24 and thus from the internal thread. Adjoining the internal hole 24 there is first provided an annular face 34 that has a radial width b3. This is defined by the spacing in the radial direction from the internal hole 24 or a thread root, to the start of the collar 18. In general, in the respective press-fit element 4, 6, the internal surface of the collar 18 is inclined obliquely in relation to the longitudinal direction 16, and so is provided overall in the manner of a conical surface.

Finally, the collar 18 is adjoined in the radial direction by the head contact face 12. The latter has a radial width b4, which in the exemplary embodiment corresponds approximately to 1.5 times the radial width b3 of the annular face 34.

As an alternative to the one-part die 36 illustrated in FIG. 2, a preferably two-part die 36 (not illustrated in more detail here) is used, which has an outer, rigid annular die flange 38 over which the collar 18 is upset. In addition, the die 36 has a support punch that is arranged concentrically in relation to the die flange 38 and is in particular spring-urged, that is to say is pressed forward by means of a spring. The support punch—or indeed a support ring—is supported under spring load against the annular face 34. This prevents damage to the internal thread of the press-fit nut 6 and ensures that the thread is true to gage.

Figure 5A:
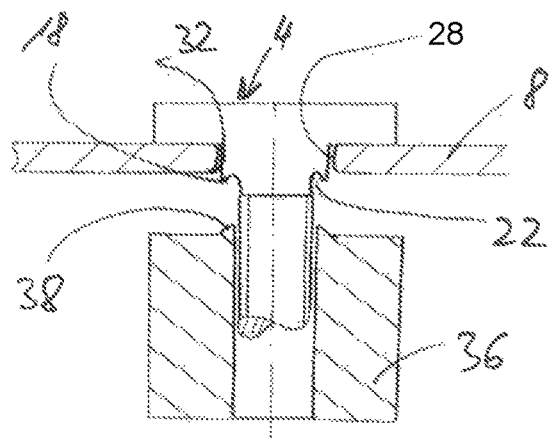
FIGS. 5A, 5B are cross sectional view for explaining the press-fit operation during press-fitting of the press-fit bolt.
Figure 5B:
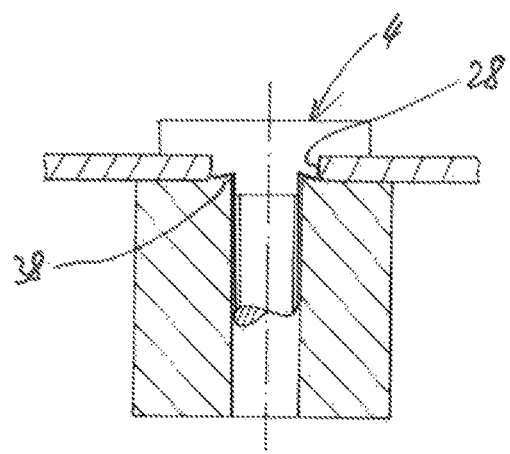

For the purpose of providing the press-fit connection 2—and as can be seen in FIGS. 5A, 5B—the press-fit bolt 4 is inserted into the hole 26 and pressed against a die 36. The die 36 has a planar die surface with a peripheral die flange 38 that in particular rises conically toward a center axis. During the press-fit operation, the die flange 38 is pressed against the collar 18, with the result that the latter is upset, and material of the collar is pressed, as a result of solid forging, at least partially radially outward and against the hole rim 28.

Here, the die flange 38 engages in the inward curve 22 by its conically tapering end face, and results in the desired upset process with solid forging.

Figure 6A:
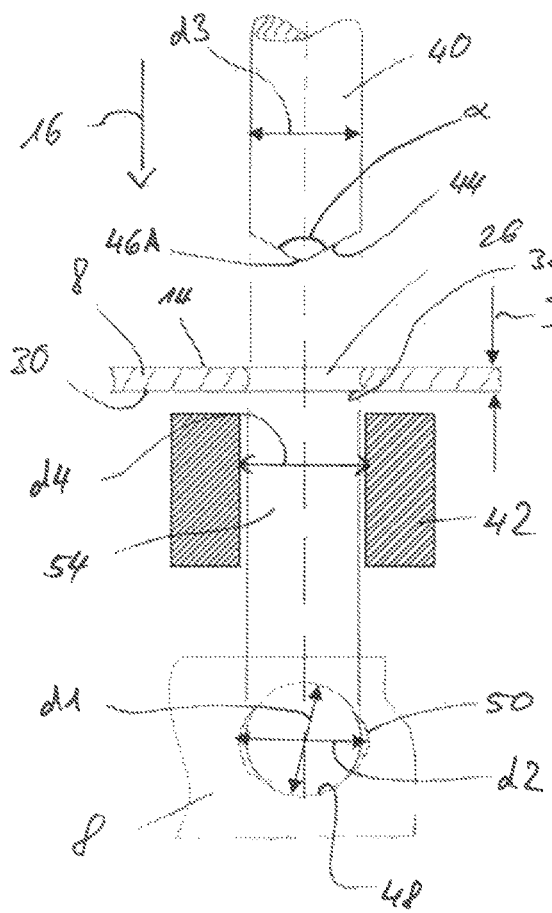
FIGS. 6A, 6B are illustrations for explaining the hole-punching operation, with a punch according to a first variant embodiment.
Figure 6B:
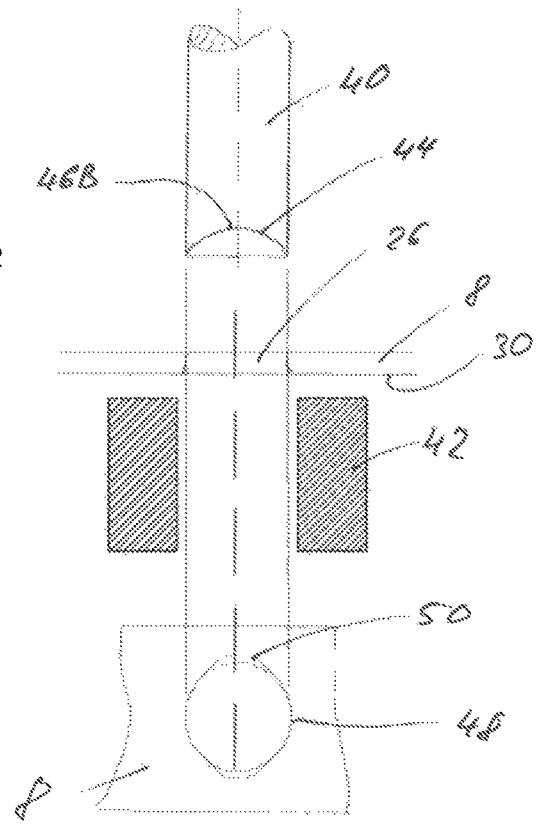
Figure 7A:
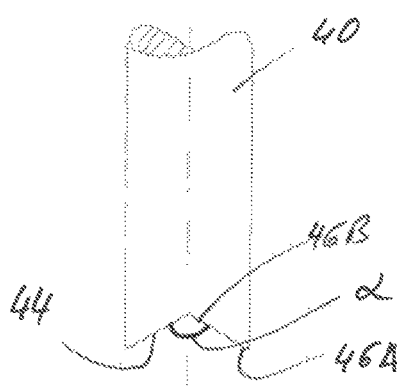
FIGS. 7A, 7B are two side views, turned through 90° in relation to one another, of a punch according to a second variant embodiment.
Figure 7B:
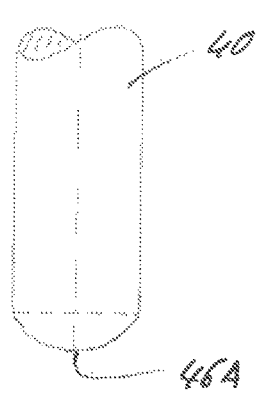

For the purpose of providing the hole 26 having the non-circular geometry, a specific punch 40 is used, in combination in particular also with a specific punching die 42 in a hole-punching operation. This will be explained below with reference to FIGS. 6A, 6B and in addition in combination with FIGS. 7A, 7B:

Here, FIGS. 6A, 6B show a first embodiment of the punch 40, and FIGS. 7A, 7B show a second variant embodiment. The respective punch 40 is rotationally symmetrical and has a circular cross sectional surface. On its end face, it has a peripheral cutter 44 on the rim. It is of crucial importance that this cutter has cutting regions that are arranged at different axial heights in the longitudinal direction 16, that is to say that the cutter 44 has leading cutting regions 46A and cutting regions 46B that are recessed in the longitudinal direction. In the case of the punch 40 according to FIGS. 6A, 6B, the end face takes the overall shape of a roof with a roof angle α of approximately 120°. The leading cutting region 46A is in this case arranged centrally and so the external regions are recessed. Here, FIG. 6B shows a view that has been turned through 90° in relation to FIG. 6A.

In contrast hereto, in the case of the punch 40 according to FIGS. 7A, 7B, the recessed cutting region 46B is arranged in the center. This thus provides in particular approximately an inverted construction, by comparison with the variant according to FIGS. 6A, 6B, with a central inward curve of the punch 40. The latter also preferably has a geometry in the shape of a roof.

In principle, other geometries are also possible as an alternative to the roof geometry. The crucial point is that the cutter 44 has the different cutting regions 46A, 46B. Here, the individual cutting regions merge continuously into one another. As can be seen in particular with reference to a comparison between the views of FIGS. 6A, 6B and 7A, 7B, which are turned through 90°, the leading cutting regions 46A have a cutting edge that tapers to a very sharp point, whereas in the region of the recessed cutting edges 46B these are made at a markedly more obtuse angle.

During the punching operation, this has the result that in the region of the recessed cutting regions 46B cutting is not performed cleanly but is rather a disrupting of the edge. As a result, the hole 26 initially has a fundamentally circular basic contour that is adapted to the circle shape of the punch 40 and runs along the circle-arc line 48. In the region of the recessed cutting regions 46B, however, the hole 26 has partial regions 50 that are disrupted radially outward and in which the peripheral contour differs from the circle contour, so overall a non-circular contour is provided. In the region of the circle-arc line 48, the hole 26 has a diameter d1 that is somewhat smaller than the hole diameter d2 in the region of the disrupted partial regions. Specifically, the hole diameter d2 is at most a few tenths of a millimeter larger than the hole diameter d1 in the region of the circle-arc line.

Here, the hole diameter d1 corresponds at least broadly speaking to a punch diameter d3 of the punch 40.

During the hole-making operation, the punch 40 is punched through the (unpierced) component 8. Here, the hole 26 is provided with the specific hole geometry that is visible from the cross sectional illustration (upper part of the drawing) or plan view (lower part of the drawing) of the component 8 according to FIG. 6A or indeed 6B. In addition, in these two figures the punching die 42 against which the component 8 is supported during the punching operation is also illustrated. Here, the punching die 42 has a central aperture 54 with a diameter d4 that is larger than the punch diameter d3 by the size of a gap. The size of this gap (also called the blade clearance) depends here on the thickness D of the component 8: the diameter d4 is greater than or equal to the punch diameter d3 plus at least 15% of the thickness D, preferably plus approximately 20% of the thickness D.

As a result of this feature, an unclean hole 26 with the above-described enlargement 32 is deliberately produced. Because of the relatively large gap size between the punch 40 and the punching die 42, the hole 26 is made larger toward the underside 30.

In the application we recite a form-locking connection also known a positive engagement. A form-locking connection is a connection formed due to the shape of the objections such as a ball and socket.

The following is a summary list of reference numerals and the corresponding structure used in the above description of the invention:

2 Press-fit connection
4 Press-fit bolt
6 Press-fit nut
8 Component
10 Head part
12 Head contact face
14 Upper side
16 Longitudinal direction
18 Collar
20 Shaft
22 Inward curve
24 Internal hole
26 Hole
28 Hole rim
30 Underside
32 Enlargement
34 Annular face
36 Die
38 Die flange
40 Punch
42 Punching die
44 Cutter
46A Leading cutting region
46B Recessed cutting region
48 Circle-arc line
50 Disrupted partial region
54 Aperture
α Roof angle
a Axial height of collar
b1 Radial width of inward curve
b2 Radial width of collar
b3 Radial width of annular face
b4 Radial width of head contact face
d1 Hole diameter of circle-arc line
d2 Hole diameter of disrupted partial region d3 Punch diameter
d4 Diameter of aperture of punching die
D Thickness of component

The invention claimed is:

1. A press-fit connection, comprising:
a high-strength component having a material thickness, an underside, and a pre-shaped hole formed through said material thickness, said pre-shaped hole extending along a line of a circle arc, and for providing resistance to twisting forces said pre-shaped hole being defined by a hole rim being other than circular in shape, said hole rim being disrupted only in partial regions which overall extend no greater than 180 degrees of a circumference of said hole rim, as a result of which a cross sectional shape that is other than circular is formed, said partial regions each having a diameter that is larger by only a few tenths of a millimeter than a diameter of said line of said circle arc; and
a press-fit element being pressed into said pre-shaped hole in said high-strength component, said press-fit element extending in a longitudinal direction and having a head part with a head contact face for lying on said high-strength component and a collar for providing resistance to extraction being effective in opposition to the longitudinal direction, said collar being pressed only by an upset process against said hole rim and said collar provides a press-fit without said collar embracing said underside of said high-strength component in an area adjacent said pre-shaped hole, said collar having a circular cross sectional geometry in a starting condition.

2. The press-fit connection according to claim 1, wherein said high-strength component has no deformation in a region of said pre-shaped hole.

3. The press-fit connection according to claim 1, wherein:
said hole rim is widened in the longitudinal direction; and
said collar forms, with said hole rim, a form locking engagement acting in opposition to the longitudinal direction.

4. The press-fit connection according to claim 1, wherein a strength of said press-fit element is less than that of said high-strength component, wherein said high-strength component has a strength of >600 MPa.

5. The press-fit connection according to claim 1, wherein a strength of said press-fit element is less than that of said high-strength component, wherein said high-strength component has a strength of >2,000 MPa.

6. The press-fit connection according to claim 1, wherein said press-fit element is a press-fit bolt having a shaft, wherein an inward curve is constructed between said shaft and said collar.

7. The press-fit connection according to claim 1, wherein said pre-shaped hole extends along the line of the circular arc except for said partial regions being two mutually opposing disrupted partial regions.

8. A press-fit connection, comprising:
a high-strength component having a material thickness, an underside, and a pre-shaped hole formed through said material thickness, said pre-shaped hole extending along a line of a circle arc, and for providing resistance to twisting forces said pre-shaped hole being defined by a hole rim being other than circular in shape, said hole rim being tattered only in partial regions, as a result of which a cross sectional shape that is other than circular is formed, said partial regions each having a diameter that is larger by only a few tenths of a millimeter than a diameter of said line of said circle arc; and
a press-fit element being pressed into said pre-shaped hole in said high-strength component, said press-fit element extending in a longitudinal direction and having a head part with a head contact face for lying on said high-strength component and a collar for providing resistance to extraction being effective in opposition to the longitudinal direction, said collar being pressed only by an upset process against said hole rim and said collar provides a press-fit without said collar embracing said underside of said high-strength component in an area adjacent said pre-shaped hole, said collar having a circular cross sectional geometry in a starting condition.

9. The press-fit connection according to claim 8, wherein said pre-shaped hole extending along a line of a circular arc except for said partial regions being two mutually opposing disrupted partial regions.

10. A method for making a press-fit connection between a press-fit element and a high-strength component, which comprises the steps of:
providing the high-strength component, the high-strength component having a material thickness and an underside;
making, with an aid of a punch and a punching die, a pre-shaped hole in the high-strength component formed through the material thickness, the pre-shaped hole extending along a line of a circle arc, and for providing resistance to twisting forces the pre-shaped hole being defined by a hole rim that is other than circular in shape, the hole rim being disrupted only in partial regions which overall extend no greater than 180 degrees of a circumference of the hole rim, as a result of which a cross sectional shape that is other than circular is formed, the partial regions each having a diameter that is larger by only a few tenths of a millimeter than a diameter of the line of the circle arc, the press-fit element extending in a longitudinal direction and having a head part with a head contact face for lying on the high-strength component and a collar for providing resistance to extraction being effective in opposition to the longitudinal direction, the collar having a circular cross sectional geometry in a starting condition; and
introducing the press-fit element via the collar into the hole with an aid of a die; and
pressing the collar is merely by an upset process and pressed against the hole rim, and the collar providing a press-fit without the collar embracing the underside of the high-strength component in an area adjacent the pre-shaped hole.

11. The method according to claim 10, wherein the die has a circular die flange.

12. The method according to claim 10, wherein the die has a die flange and a spring-urged inner support element that projects beyond said die flange and is supported against an annular face of said press-fit element.

13. The method according to claim 10, which further comprises producing the hole with the aid of the punch that has a peripheral cutter which has cutting regions that are recessed in a longitudinal direction, for producing a disrupted partial region.

14. The method according to claim 10, wherein the punch is in a shape of a roof at its front end face.

15. The method according to claim 10, which further comprises forming the punching die with a central aperture having a diameter corresponding to a diameter of the punch plus more than 15% of a thickness of the high-strength component.

16. The method according to claim 10, which further comprises forming the punching die with a central aperture having a diameter corresponding to a diameter of the punch and more than 18% of a thickness of the high-strength component.

* * * * *